United States Patent Office 3,440,475
Patented Apr. 22, 1969

3,440,475
LANTHANUM HEXABORIDE CATHODE SYSTEM
FOR AN ELECTRON BEAM GENERATOR
Siegfried Schiller, Harry Förster, and Peter Lenk, Dresden, Germany, assignors to VEB Lokomotivbau-Elektrotechnische Werke "Hans Beimler," Oranienburg, Germany
Filed Apr. 11, 1967, Ser. No. 629,951
Int. Cl. H01j 19/20
U.S. Cl. 313—337                                      10 Claims

ABSTRACT OF THE DISCLOSURE

A massive cathode body comprising lanthanum hexaboride has a large surface area and is supported by a tantalum enclosure and support wires in an electron beam generator. A primary cathode, which is a filament structure of tantalum coated with lanthanum hexaboride, is mounted in the electron beam generator in operative proximity with the cathode body. An electrical energizing circuit connected to the primary cathode provides a flow of direct current through the primary cathode to heat it to emit electrons and thereby to heat the cathode body by electron bombardment to emit electrons from the large surface area of the cathode body.

BACKGROUND OF THE INVENTION

Field of the invention

The present invention relates to a cathode system for an electron beam generator. More particularly, the invention relates to a lanthanum hexaboride cathode system for an electron beam generator.

Description of the prior art

High intensity of high capacity electron sources almost exclusively utilize thermoemission of a highly heated cathode for generating electrons. The cathodes are desired to provide a high emission current density at the lowest possible temperatures to have a long service life and to be only slightly susceptible to contamination. Massive bolts or lamellae indirectly heated by electron bombardment are utilized as cathodes when a long service life is desired. The primary cathode is positioned directly adjacent the cathode and is energized by a flow of direct current therethrough to emit electrons. The electrons emitted by the primary cathode are accelerated by a voltage of a few hundred to a few thousand volts applied between the primary cathode and the cathode. The electron energy is converted into heat by the cathode, which is positively biased relative to the primary cathode, and it is possible to heat said cathode to its required emission temperature at a small current.

The cathode may be made of tantalum, tungsten or other suitable highly fusing metals or their alloys, due to the slight susceptibility of such metals of contamination by gases and vapors. Oxides are not utilized as cathodes because they are highly susceptible to contamination by gases and vapors. Tungsten, tantalum and similar metals are not suitable as cathodes because they provide the required emission current densities at high temperatures only. Thus, tungsten, for example, has an emission current density of approximately 4 A. cm.$^{-2}$ at a temperature of 2800° C. Such a high temperature facilitates the process of cathode comminution or disintegration by retrogressive positive ions and results in the destruction of the cathode in a relatively short time. The high temperature also causes distortion of the cathode support and thereby necessitates frequent adjustment.

The cathode may be made of lanthanum hexaboride (LaB$_6$) which provides emission current densities as high as those provided by tungsten but at a temperature about 100° C. lower than that required by tungsten. Furthermore, lanthanum hexaboride does not indicate a substantial susceptibility to contamination. When a massive cathode body of lanthanum hexaboride is heated by electron bombardment, its mechanical stresses cause it to burst or crack after only a few hours of operation, and it falls out of the cathode support. The cathode support comprises a plurality of thin metal pins which engage slots or bores in the cathode body. The pins are utilized due to the desired low heat elimination.

The utilization of primary cathodes of metal causes considerable variations of filament power at the cathode body. This is caused by reciprocal vapor deposition and different emission potentials, as well as alloy formation. It is, therefore, not possible to utilize a cathode body of lanthanum hexaboride with a tungsten wire primary cathode unless expensive ancillary stabilizing apparatus is also utilized.

SUMMARY OF THE INVENTION

The principal object of the present invention is to provide a new and improved cathode system for an electron beam generator. The cathode system of the present invention overcomes the shortcomings and disadvantages of the known cathode systems of the type utilizing a massive cathode body having a large surface area of lanthanum hexaboride. The cathode system of the present invention has an increased service life of substantially 50 hours. The cathode body of the cathode system of the present invention does not burst or crack and may be readily removed and replaced, as desired. The cathode body of the cathode system of the present invention comprises lanthanum hexaboride and almost never requires readjustment. The crater which is created by ion bombardment at the center of the cathode body is considerably smaller than a crater which would be created at the same emission current density under conditions of maximum effectiveness in cathodes comprising tungsten or tantalum. The filament power of the lanthanum hexaboride cathode body of the cathode of the present invention is one third to one fourth that of a tungsten or tantalum cathode body at the same emission current density. Cracking of the cathode body of the cathode system of the present invention does not change the position of the cathode body and cracking or bursting thereof is prevented to the utmost. The service life of an electron beam generator utilizing the cathode system of the present invention may be greater than 100 hours when such electron beam generator is utilized in an electron beam furnace.

In accordance with the present invention, a cathode system for an electron beam generator comprises a massive cathode body comprising lanthanum hexaboride. The cathode body has a large surface area. A cathode support comprising a metal enclosure supports the cathode body in an electron beam generator. A primary cathode is mounted in the electron beam generator in operative proximity with the cathode body and comprises a metal filament structure including lanthanum hexaboride. An electrical energizing circuit connected to the primary cathode provides a flow of direct current through the primary cathode to heat the primary cathode to emit electrons and thereby to heat the cathode body by electron bombardment to emit electrons from the large surface area thereof.

The primary cathode may comprise lanthanum hexaboride or tantalum coated with lanthanum hexaboride. The primary cathode and the enclosure of the cathode support comprise the same material, such as tantalum. The enclosure of the cathode support encloses the cathode body except the large surface area thereof and is of substantially annular configuration. Support wires support the enclosure of the cathode support in operative proximity with the primary cathode in the electron beam generator.

BRIEF DESCRIPTION OF THE DRAWING

In order that the present invention may be readily carried into effect, it will now be described with reference to the accompanying drawing, wherein.

DESCRIPTION OF THE PREFERRED EMBODIMENT

Figure 1:
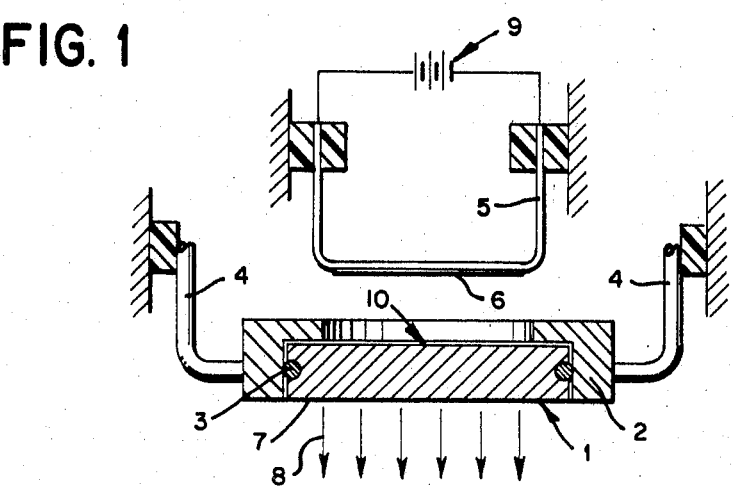
FIG. 1 is a side view, partly in section, of an embodiment of the cathode system of the present invention.
Figure 2:
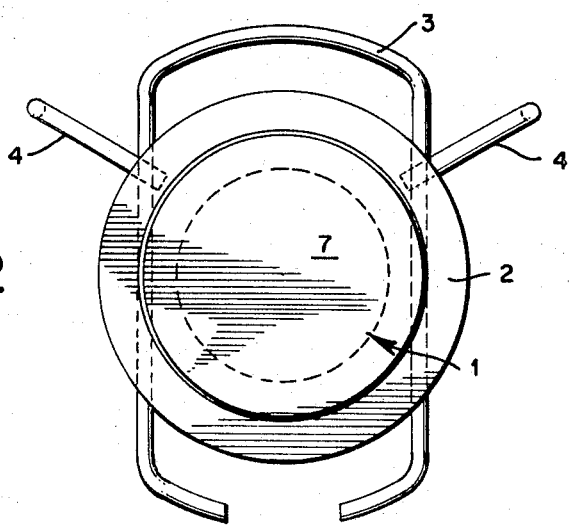
FIG. 2 is a bottom view of the embodiment of FIG. 1.

In FIG. 1, the axis of the emitting surface of the massive cathode body 1 extends downwardly from and perpendicular to said surface. The massive cathode body 1 comprises lanthanum hexaboride and has a large surface area 7.

A cathode support supports the cathode body 1 in an electron beam generator. The cathode support comprises a substantially annular metal enclosure 2 and support wires or a support wire braces 4 which supports the enclosure 2 in the electron beam generator. The cathode body 1 is supported in the enclosure 2 by a wire brace or support wire 3. The enclosure 2 of the cathode support preferably comprises tantalum.

The enclosure 2 of the cathode support encloses the cathode body 1 except the large surface area 7 thereof, which is maintained clear and functions as the electron emission surface of said cathode body.

A primary cathode 5 is mounted in the electron beam generator in operative proximity with the cathode body 1. The primary cathode 5 comprises a metal filament structure and preferably comprises tantalum coated with lanthanum hexaboride. The lanthanum hexaboride coating is schematically indicated in FIG. 1 as a layer 6.

An electrical energizing circuit 9 is connected to the primary cathode 5 and provides a direct current flow through said primary cathode. The current flowing through the primary cathode 5 heats said primary cathode and said primary cathode emits electrons which bombard the cathode body 1 via its surface 10 and thereby heat said cathode body. The cathode body 1 is also heated by heat transfer from the enclosure 2. The heated cathode body 1 emits electrons from its surface 7, as indicated by the electron density 8.

If the enclosure 2 is of substantially annular configuration with a closed base end covering the surface 10 of the cathode body 1, the electron bombardment from the primary cathode 5 heats only said enclosure and not said cathode body. The cathode body 1 is then heated only by heat transfer from the enclosure 2. The primary cathode 5 is not coated with lanthanum hexaboride, in this case.

The support wires or wire braces 4 and the primary cathode 5 are insulatedly supported in the electron beam generator by any suitable mounting means, as schematically indicated in FIG. 1.

While the invention has been described by means of a specific example and in a specific embodiment, we do not wish to be limited thereto, for obvious modifications will occur to those skilled in the art without departing from the spirit and scope of the invention.

What is claimed is:

1. A cathode system for an electron beam generator, comprising
    a massive cathode body comprising lanthanum hexaboride and having a large surface area;
    cathode supporting means supporting said cathode body in an electron beam generator, said cathode supporting means comprising a metal enclosure;
    a primary cathode mounted in said electron beam generator in operative proximity with said cathode body, said primary cathode comprising a metal filament structure including lanthanum hexaboride; and
    electrical energizing means connected to said primary cathode for heating said primary cathode to emit electrons and thereby to heat said cathode body by electron bombardment to emit electrons from the large surface area thereof.

2. A cathode system as claimed in claim 1, wherein said primary cathode comprises lanthanum hexaboride.

3. A cathode system as claimed in claim 1, wherein said primary cathode comprises metal coated with lanthanum hexaboride.

4. A cathode system as claimed in claim 1, wherein said primary cathode comprises tantalum coated with lanthanum hexaboride.

5. A cathode system as claimed in claim 1, wherein said primary cathode and the enclosure of said cathode supporting means comprise the same material.

6. A cathode system as claimed in claim 1, wherein said primary cathode and the enclosure of said cathode supporting means comprise tantalum.

7. A cathode system as claimed in claim 1, wherein the enclosure of said cathode supporting means comprises tantalum.

8. A cathode system as claimed in claim 1, wherein the enclosure of said cathode supporting means encloses said cathode body except the large surface area thereof.

9. A cathode system as claimed in claim 1, wherein said cathode supporting means comprises a substantially annular metal enclosure and support wire means for supporting said enclosure in operative proximity with said primary cathode in said electron beam generator.

10. A cathode system as claimed in claim 9, wherein the enclosure of said cathode supporting means encloses said cathode body except the large surface area thereof, said primary cathode and said enclosure comprise tantalum and said primary cathode is coated with lanthanum hexaboride and said electrical energizing means comprises circuit means for providing a flow of direct current through said primary cathode.

References Cited

UNITED STATES PATENTS

| | | | |
|---|---|---|---|
| 2,639,399 | 5/1953 | Lafferty | 313—337 X |
| 2,659,685 | 11/1953 | Lafferty | 313—346 X |
| 3,273,003 | 9/1966 | Dietrich | 313—337 X |
| 3,273,005 | 9/1966 | Lafferty | 313—337 X |
| 3,312,856 | 4/1967 | Lafferty et al. | 313—337 X |

JOHN W. HUCKERT, *Primary Examiner.*

A. J. JAMES, *Assistant Examiner.*

U.S. Cl. X.R.

313—270, 345, 346